F. W. CORSON.
GENERATOR TESTING APPARATUS.
APPLICATION FILED SEPT. 30, 1916.

1,296,164.

Patented Mar. 4, 1919.
2 SHEETS—SHEET 1.

Inventor
Floyd Watson Corson
by
Atty.

F. W. CORSON.
GENERATOR TESTING APPARATUS.
APPLICATION FILED SEPT. 30, 1916.
1,296,164.
Patented Mar. 4, 1919.
2 SHEETS—SHEET 2.
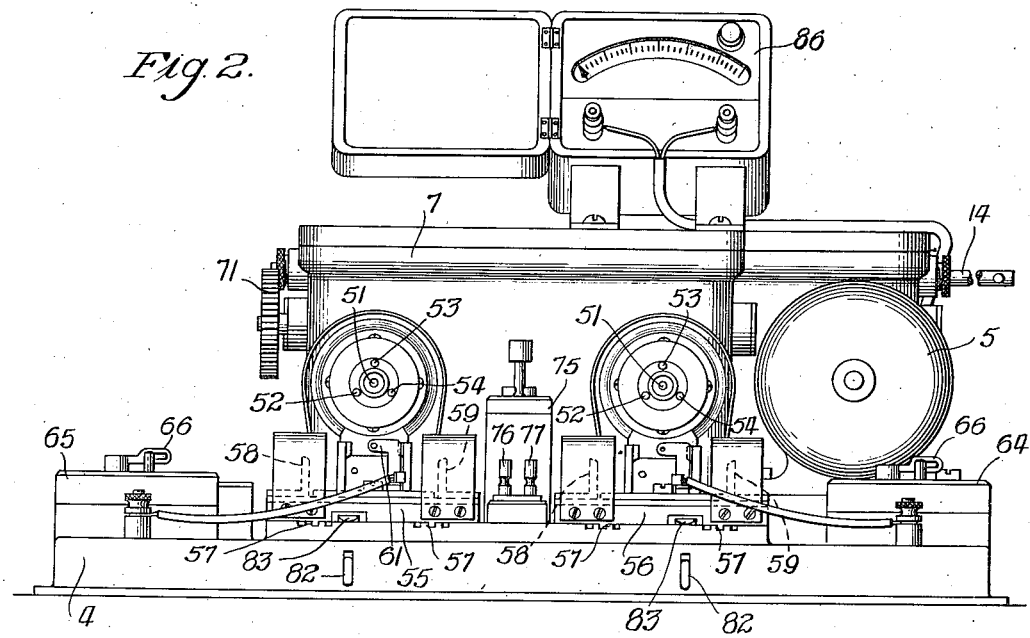
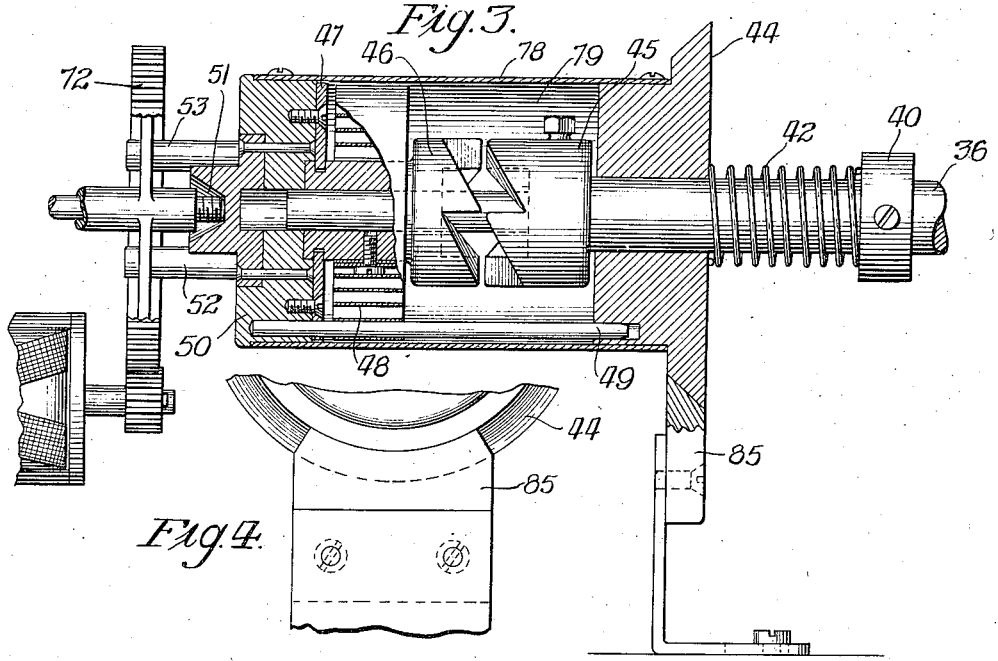
Inventor
Floyd Watson Corson

UNITED STATES PATENT OFFICE.

FLOYD WATSON CORSON, OF CHICAGO, ILLINOIS, ASSIGNOR TO WESTERN ELECTRIC COMPANY, INCORPORATED, OF NEW YORK, N. Y., A CORPORATION OF NEW YORK.

GENERATOR-TESTING APPARATUS.

1,296,164.     Specification of Letters Patent.     Patented Mar. 4, 1919.

Application filed September 30, 1916. Serial No. 123,007.

*To all whom it may concern:*

Be it known that I, FLOYD WATSON CORSON, a citizen of the United States, residing at Chicago, in the county of Cook and State of Illinois, have invented certain new and useful Improvements in Generator-Testing Apparatus, of which the following is a full, clear, concise, and exact description.

This invention relates to a generator testing apparatus, and more particularly to an improved and efficient apparatus for testing magneto generators.

Magneto generators are generally designed to deliver certain definite voltages for specific loads, and to insure the satisfactory commercial operation of the generators within these limits they must meet certain test requirements after they are assembled. It is the object of this invention to provide an improved and efficient apparatus for rotating generator armatures at a specific rate so that they may be tested to determine their electrical characteristics.

The invention is illustrated in the accompanying drawings in which:

Fig. 2 is a front elevation of the testing apparatus;

Fig. 3 is a vertical section of the clutch and the magneto generator armature revolving means;

Fig. 4 is a fragmentary end view of Fig. 3, illustrating the friction collar.

The preferred form of the invention herein illustrated and described is adapted for the testing of magneto generators which are used to generate signaling currents in telephone systems. The armatures of magnetos of this type are manually operated, the armature shaft being rigidly attached to a small gear wheel which meshes with a larger gear wheel which is turned by hand. The ratio between these gears is such that the armature will be turned over at approximately 1000 revolutions per minute for ordinary hand operation.

Figure 1:
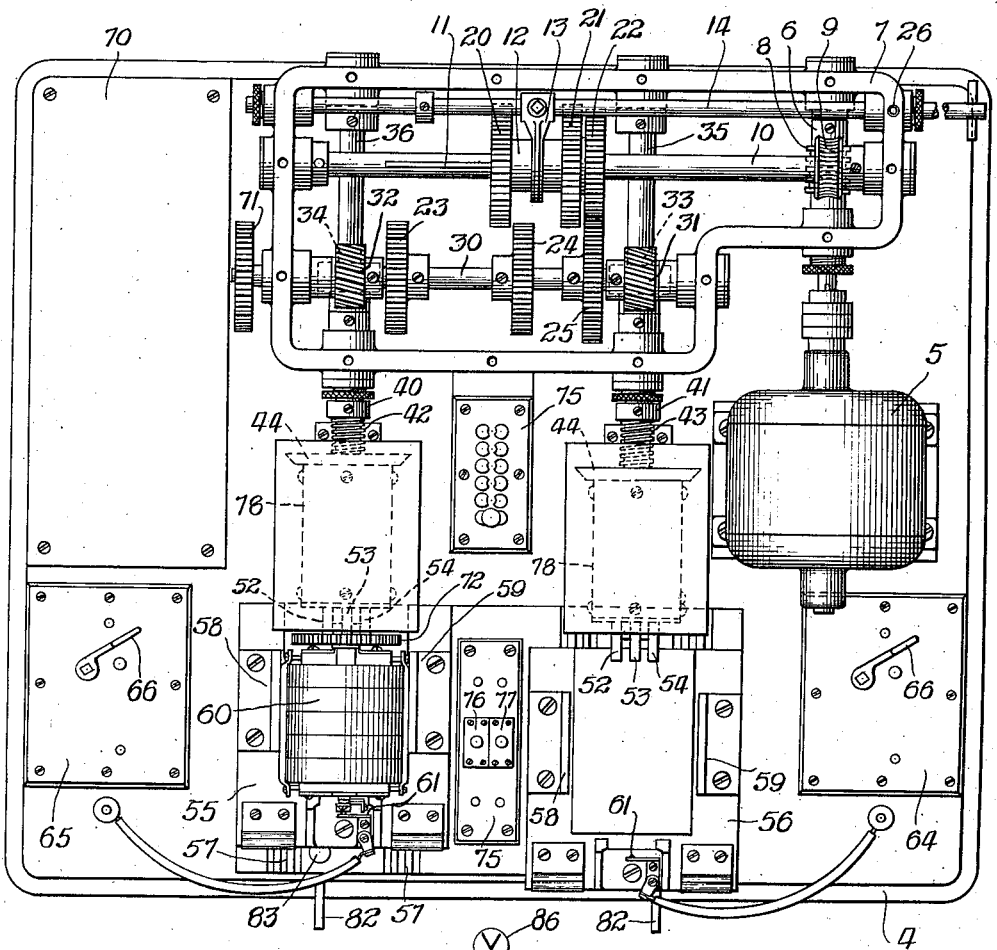
Figure 1 is a plan elevation of the testing apparatus with the covering of the gear housing removed.

As illustrated in the drawings, the testing apparatus is all secured to a cast brass base 4. Any suitable constant power driving means, such as the motor 5, may be used for operating the apparatus. As shown in Fig. 1, the spindle of the motor 5 is fastened to a shaft 6, which is journaled in the front and rear walls of a gear housing 7. The shaft 6 is equipped with a worm 8 meshing with a worm wheel 9 which is secured to a shaft 10. The shaft 10 is journaled in the side walls of the gear housing 7 and is rotated through the worm 8 and its associated worm wheel 9 by the motor 5. Slidably mounted in a keyway 11 of the shaft 10 is a sleeve 12. An arm 13 loosely fitted on the sleeve 12 and secured to a gear shift rod 14 serves as a means for moving the sleeve 12 in its keyway 11. Securely attached to the sleeve 12 are the three gear wheels 20, 21, and 22 which can be moved by the gear shift rod 14 so that they will mesh with the gears 23, 24, and 25 respectively, depending upon the position of the gear shift rod 14. The gear shift rod 14 is fitted with three depressions which coöperate with the spring-pressed pin 26, and these depressions together with the pin 26 serve as an indicating means for positioning the gear shift rod 14 so that one of the gears 20, 21, and 22 will mesh with its corresponding gear wheel 23, 24, and 25 for each one of these positions. The three sets of gears shown make it possible to obtain three different speeds for a shaft 30 on which the gear wheels 23, 24, and 25 are mounted, and it will be evident that the number of speed changes for the shaft 30 can be readily increased by the addition of more gear sets. The shaft 30 is journaled in the side walls of the housing 7 and is equipped at either end with a spiral gear 31 and 32. The spiral gears 31 and 32 coöperate with spiral gears 33 and 34 which are secured to the shafts 35 and 36 respectively journaled in the front and rear walls of the gear housing 7 and which extend beyond the front wall of the housing. Immediately outside of the front wall of the housing these shafts are equipped with collars 40 and 41 respectively, against which are fitted the spiral springs 42 and 43 respectively. Each of these spiral springs, as indicated in Fig. 3, is held in compression between the collar and a friction disk 44, thereby holding this disk against the fiber friction plate 85. The shaft 36 extends through the friction disk 44 and the power member 45 of a jaw clutch which is secured thereto. Immediately beyond the clutch member 45 the shaft 36 is reduced in diameter and extends through a coöperating slidable member 46 of the clutch.

Securely fastened to the clutch member 46 is one end of a coiled spring 48, the other end of said spring being attached to the pin 49. The pin 49 is fitted in a slot in the friction disk 44 and a collar 50 which constitutes the front face of the slidable part of the clutch. The collar 50 constitutes the supporting means of a disk 51, a ring 47, and the projecting pins 52, 53, and 54. The ring 47 is loosely fitted in the shank of the clutch member 46 and thus serves to secure said member by means of the housing 78 to the disk 44. The housing 78 incloses the clutch mechanism and also connects the friction disk 44 to the collar 50. The clutch member 46 is shifted into operative relation with the power member 45 by a pressure exerted on the disk 51 through the shaft of a magneto which is thrust into the tapered central cavity in said disk. Such a pressure will shift the collar 50 and its associated mechanism, as well as the friction disk 44 on the shaft 36, against the tension of the spring 42 and will cause engagement between the jaws of the slidable clutch member 46 and the power clutch member 45. The chamber 79 inclosing the clutch members 45 and 46 is preferably filled with oil to insure the smooth operation of the clutch. The friction disk 44 and its associated plate 85 prevent the turning of the slidable part of the clutch mechanism when it is in its normal position, in which position a certain amount of movement would be transmitted from the clutch member 45 to the member 46 through the viscosity of the oil but for this friction device.

Mounted at the front end of the base plate 4 are the two jigs 55 and 56. These jigs are fitted with keys which slide in the slots 57 grooved in the face of the base plate 4. Each of these jigs is equipped with uprights 58 and 59 between which a magneto 60 which is to be tested is placed. These uprights 58 and 59 prevent lateral movement of the generator while it is being tested. Mounted on the front end of the jig is a contact spring 61 which connects with the terminal of the magneto 60 when it is placed in position on the jig. Suitably placed on either side of the base plate 4 are the timing devices 64 and 65 which are clock operated devices which may be operated to short circuit the magneto that is being tested for a definite period by actuating the handle 66. Placed at the left side of the base plate 4 is a plate of non-magnetic material 70 which is used as a supporting base for testing special generators which will not fit the jigs 55 or 56. The armatures of generators tested on this plate are revolved by the gear wheel 71. The base plate 70 is so mounted that the point of contact between the gear wheel of the generator to be tested and the gear wheel 71 is below the axis of the gear 71 and consequently the gear 71 in revolving will tend to pull the teeth of the gear wheel of the generator into mesh with its own teeth. Consequently when a magneto has been placed on the plate 70 so that the teeth of its gear wheel mesh with the teeth of the gear 71 these two gears will remain in mesh without any retaining force and the magneto armature will be revolved until the magneto is withdrawn. The electrical apparatus used for testing the generators, such as the resistance box 75 and the keys 76 and 77 are mounted on the base plate 4, as shown in Fig. 1. The voltmeter 86 is mounted on the top of the gear housing, as illustrated in Fig. 2.

The operation of the apparatus is as follows:

The gear shift rod 14 is first moved into position so that the desired speed will be obtained through the gears mounted in the gear housing 7. The motor 5 is then started which, through the gearing and shafting previously described, will revolve the shafts 35 and 36. A generator is next placed on one of the jigs 55 or 56 and the jig is moved forward so that the pins 52, 53, and 54 will engage the spokes of the generator wheel 72. When the jig is moved forward the shaft of the generator gear wheel 72 will press against the disk 51 and this will shift the collar 50 and its associated mechanism. When the jig is moved to its extreme forward position a spring pressed catch 83 will hold the jig in this positon and the clutch member 46 will engage the clutch member 45 and the revolving shaft 36 will transmit this motion to the clutch member 46. The revolutions of the clutch 46 will be transmitted to the coil spring 48 which will wind up to overcome the starting torque of the magneto after which the armature of the magneto under test will be gradually accelerated until the generator wheel 72 is revolving at the same speed as the shaft 36. Due to the yielding connection of the spring 48 between the clutch 46 and the collar 50, the magneto wheel 72 is not suddenly revolved at the angular speed of the shaft 36. This gives the gears controlling the movement of the magneto armature a chance to speed up gradually and thus prevents the stripping of these gears and it likewise prevents severe jars to the magneto parts which would result if the normal operating speed of the magneto were suddenly applied.

Figure 5:
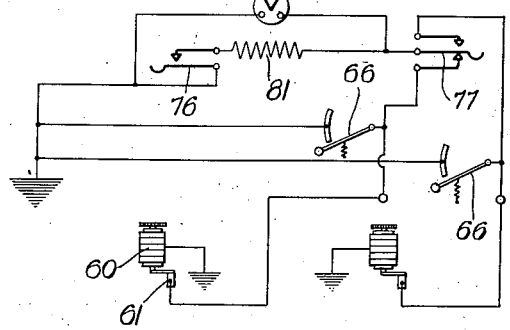
Fig. 5 is a diagram of the generator testing circuit.

When the magneto is in position on the jig and it is pushed forward so that the magneto armature is revolving at normal speed the electrical tests of the magneto are conducted. As indicated in Fig. 5, one end of the winding of the magneto armature is grounded and the other end of the winding is connected through the insulated terminal 61 to the test circuit. In making these tests the magneto is first short circuited for a definite period by operating the arm 66 of the timing device. When the arm 66 returns to normal and the short circuit is removed, the open voltage of the magneto is read by means of the voltmeter 86. This circuit may be traced from the ground through the armature of the magneto, the key 77 and the voltmeter 86 to ground. When the open voltage of the magneto has been measured the key 76 is operated which places the resistance load 81 in parallel with the voltmeter 86, and the voltage generated by the magneto under load is then read on the voltmeter. When a magneto has been tested, the arm 82 is depressed which lowers the catch 83 so that the jig will be returned to normal by the force exerted by the spiral spring 42 which is held in compression when the jig is in its forward position.

The testing apparatus herein described is designed for the simultaneous testing of two generators and consequently the electrical testing operations are practically continuous, since the open and load voltages of one magneto may be read during the period that the other magneto is subjected to the short circuiting test. The key 77 is used to switch the voltmeter and load circuits from one magneto to the other.

It will be apparent that the mechanism described and illustrated is not limited in its utility to this specific form, and that the structural features described need not all be included in a single machine. Furthermore, various changes may be made in the apparatus without departing from the invention, as set out in the appended claims.

What is claimed is:

1. In a device for testing magneto generators, the combination with a rotatable spindle, of adjustable means for varying the speed of said spindle, a magneto armature revolving means, a clutch mechanism for connecting said means to said revoluble spindle, and a yieldable interconnecting means between said armature revolving means and said clutch mechanism to gradually accelerate said armature revolving means.

2. A device for testing gear driven magneto generators comprising in combination, a revoluble spindle, means for revolving said spindle, a clutch member rotated by said spindle, a shiftable clutch member coöperating therewith, a magneto gear driving means, and a yielding means interconnecting said driving means with said shiftable clutch member whereby said magneto gear is gradually accelerated.

3. A device for testing gear driven magneto generators comprising in combination, a rotatable spindle, a clutch member rotated thereby, a shiftable mechanism including a second clutch member and a magneto gear driving means interconnected by a yielding means, and a magneto supporting means capable of relative movement from and toward said shiftable mechanism whereby said clutch members can be brought into coöperative relation and the magneto gear revolved by said driving means.

4. A device for testing gear driven magneto generators comprising in combination, a revoluble spindle, means for revolving said spindle, a clutch member rotated by said spindle, a shiftable clutch member coöperating therewith, a magneto gear driving means, a magneto jig slidably mounted whereby the magneto may be shifted into operative relation with said magneto gear driving means and said clutch members may be moved into operative relationship, and a yielding means interconnecting said driving means with said shiftable clutch member whereby said magneto gear is gradually accelerated.

5. In a device of the class described, the combination with a rotatable spindle, of inter-related gears and shafts for adjusting the angular speed of said spindle, a magneto gear driving means, a clutch mechanism associated with said spindle for rotating said driving means, and a yielding connection between said clutch mechanism and said driving means for gradually accelerating the angular speed of the magneto gear.

6. In a device of the character described, the combination with a rotatable spindle, of a clutch member rotated thereby, a shiftable clutch member coöperating therewith, a plurality of magneto gear spoke engaging pins, a yielding means interconnecting said shiftable clutch member and said pins, a magneto supporting means capable of relative movement toward said pins whereby said clutch members are brought into coöperative relationship and the magneto gear is revolved by said pins.

7. In a device for testing gear driven magneto generators, the combination with a rotatable spindle, of a clutch mechanism, a magneto gear rotating means that may be rotated by said spindle through said clutch mechanism, and means operable to shift said magneto gear into rotatable relationship with said rotating means and to actuate said clutch mechanism.

In witness whereof, I hereunto subscribe my name this 23 day of Sept. A. D. 1916.

FLOYD WATSON CORSON.